United States Patent [19]

Mizutani

[11] 3,880,814

[45] Apr. 29, 1975

[54] GEL CHROMATOGRAPHY MATERIAL AND PREPARATION THEREOF

[76] Inventor: Kiyoshi Mizutani, No. 3-19, 3-chome, Kamikizaki, Saitama-Prefecture, Japan

[22] Filed: Feb. 2, 1971

[21] Appl. No.: 112,048

[52] U.S. Cl. ........ 260/78.5 R; 260/2 R; 260/77.5 C; 260/80 P; 260/80.3 R; 260/80.3 N
[51] Int. Cl. ......... C08f 3/38; C08f 3/44; C08f 3/48
[58] Field of Search......... 260/78.5 R, 80 P, 80.3 R, 260/80.3 N, 77.5 C, 2.5 R, 2.5 B

[56] References Cited
UNITED STATES PATENTS

| | | | |
|---|---|---|---|
| 3,350,363 | 10/1967 | Hurwitz | 260/77.5 |
| 3,369,008 | 2/1968 | Hurwitz | 260/80.72 |
| 3,580,879 | 5/1971 | Higashimura | 260/29.7 H |
| 3,681,269 | 8/1972 | Heitz et al. | 260/2.5 B |

FOREIGN PATENTS OR APPLICATIONS 41-4570   3/1966   Japan

Primary Examiner—Joseph L. Schofer
Assistant Examiner—John Kight
Attorney, Agent, or Firm—Armstrong, Nikaido & Wegner

[57] ABSTRACT

A new gel chromatography material is prepared as uniform spherical particles by the suspension polymerization of N, N'-(diacrylamidomethyl) ethylene or propylene urea either alone or together with one or more than one monomer having a ethylenically unsaturated double bond and copolymerizable therewith, such as acrylamide, methacrylamide, acrylic acid, methacrylic acid, itaconic acid, maleic acid and bis-acrylamide. The gel chromatography material has a structure characterized by a relatively large pore size due to the long chain of the urea compound acting as a cross-linking agent, and the pore size may be altered by changing the molar ratio of the urea compound to the copolymerizing monomers. The gel chromatography material is useful not only for separating various high molecular weight substances, such as proteins, from low molecular weight compounds in aqueous solution, but it is also effective for the separation of various compounds having different molecular size.

1 Claim, No Drawings

GEL CHROMATOGRAPHY MATERIAL AND PREPARATION THEREOF

BACKGROUND OF THE INVENTION

The present invention relates to a gel chromatography material of a polymer or copolymer cross-linked by N,N'-(diacrylamidomethyl) ethylene urea or N,N'-(diacrylamidomethyl) propylene urea, and a method for preparing the same, especially in uniform spherical shape. A cross-linked copolymer of methylenebisacrylamide and acrylamide has been heretofore known as a gel chromatography material of this type. However, it is difficult using the known technique to prepare an extremely porous gel by cross-linking with methylenebisacrylamide, because the chain length of methylenebisacrylamide is too short to serve as a cross-linking agent to form such a copolymer. Therefore, if a reduced molar ratio of methylenbiscrylamide is used, it would become difficult to produce a water-insoluble copolymer which is usable as gel chromatography material.

The present invention provides gel chromatography material of different swelling properties according to the wide range change of molar ratio of the cross-linking agent, which has a relatively long chain-length. The novel method of the invention provides the above gel chromatography material in the form of uniform spherical particles.

SUMMARY OF THE INVENTION

According to the present invention, a gel chromatography material is prepared by subjecting a urea compound having the formula

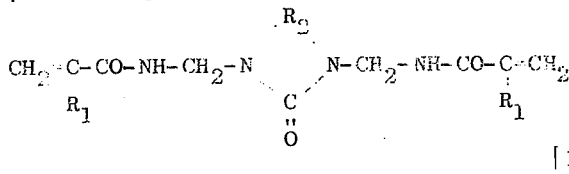

[I]

wherein $R_1$ is a hydrogen atom or a methyl group, and $R_2$ is an ethylene or trimethylene group, to suspension polymerization and gelation either by itself or together with at least one ethylenically unsaturated monomer having at least one functional group.

In a preferred embodiment of the invention, the gel chromatography material is prepared in the form of uniform spherical particles by adding a catalyst to the solution of reactants at such a temperature that there is no substantial polymerization, admixing the resulting solution with another liquid which is immiscible with the solution, agitating the mixture vigorously to make the solution into a uniform suspension of spherical droplets, and then increasing the temperature of the system to induce polymerization, cross-linking and complete gelation of the spherical droplets.

DETAILED DESCRIPTION

The urea compound represented by the formula (I) which is used as the cross-linking agent of the polymer of the urea compound either alone or in combination with other ethylenically unsaturated compounds, possesses a relatively long chain structure, is strongly hydrophilic, and has appropriate polymerization ability. Therefore, according to the present invention, an extremely porous water-insoluble gel chromatography material can be easily prepared by reducing the molar ratio of the cross-linking urea compound in the copolymerization reaction mixture.

The swelling properties and molecular sieve effect of the cross-linked polymer of the invention are different from those of that obtained using methylenebisacrylamide as the cross-linking agent; thus the gel structure of these two types of polymers are quite different. All of the polymers obtained in the present process are hydrophilic and show excellent molecular sieve effect.

The ethylenically unsaturated compounds used in the invention include acrylamide, methacrylamide, acrylic acid, methacrylic acid, itaconic acid, maleic acid, bisacrylamide and the like. Among them, acrylamide type compounds are particularly recommendable.

The composition of the cross-linked polymer prepared by the method of the invention can be varied depending on the pore size of the particles desired. Thus, when a gel particle having small pore size in the swollen state is desired, the proportion of the urea compound of the formula (I) is increased, and when a gel particle with large pore size is desired the proportion is correspondingly reduced. In this way, a cross-linked polymer having a desired molecular sieve effect range can be obtained. In general, the amount of the urea compound used in case of copolymerization with the ethylenically unsaturated compound is selected so as to be between 2 and 60 percent by weight in the resultant copolymer.

The suspension polymerization according to the present invention is accomplished by dissolving the above-mentioned monomer or monomers in a solvent and suspending the resultant solution in an inert liquid which is a non-solvent for the compound as well as being immiscible with the solvent. Useful solvents include water and alcohols; water being the most preferable. The inert liquid used is selected from those having a specific gravity approximating that of the reactant solution. Thus chlorobenzene, dichlorobenzene, toluene, benzene, carbon tetrachloride, trichloroethylene, dichloroethylene and the like or appropriate mixtures thereof may be used. The concentration of the monomer in the solution is 3 to 50 percent by weight, and preferably 5 to 35 percent by weight. The larger the concentration of the monomer or monomers the smaller the pore size of the resultant gel particles tends to be when in the swollen state.

The factors which affect the reaction rate are the nature of the compounds to be polymerized and the nature of catalyst as well as the amount thereof, and reaction temperature. Accordingly, the reaction rate in the polymerization of a specific compound can be controlled by selecting appropriately the kind of catalyst and amount thereof, and the temperature of reaction system.

As the catalyst, there may be used a common catalyst for this type of suspension polymerization, such as peroxides, for example, potassium persulfate, ammonium persulfate or hydrogen peroxide; alkali chlorates; and metal ions having more than two different atomic valences, for example, copper, iron or tin. The amount of the catalyst used is important in connection with the reaction temperature with respect to the control of the reaction rate, and is generally chosen in the range of 0.1 to 10 percent based on the weight of the reactant to be polymerized. When the reaction is carried out in aqueous solution, it is preferable to adjust the pH of the solution by adding a water soluble alkali salt of an organic acid.

The reaction temperature is chosen in the range between 50° and 90°C. In the preparation of the uniform spherical gel chromatography material of the present invention, although the amount of catalyst with respect to that of the compound to be polymerized varies depending upon the nature of the polymer, the specific amount also depends upon the reaction temperature. The amount used must be such that there is no substantial reaction at the catalyst addition temperature. The reaction occurs at a temperature higher than that temperature to complete gelation. For instance, ammonium persulfate is used in an amount of 0.2 percent based on the weight of acrylamide at a temperature of 60°C, and 30 percent hydrogen proxide is used in an amount of 8 percent based on a temperature of 40°C.

Stirring is another important factor in the process of the present invention. Thus, the process used to disperse the solution of the reactants as a uniform suspension of spherical droplets in the non-solvent liquid and to maintain the droplets in such state is controlled by stirring. The conditions of the stirring may be predetermined. After the suspension is formed, it is necessary to prevent collision between the suspended particles.

It is also preferable to add a stabilizer to maintain a uniform suspension. In case in which an aqueous solution of the monomer is used, suitable stabilizers include water insoluble high molecular weight substances, such as polyvinyl acetate, polystyrene, polyisobutylene and cellulose acetate butyrate and the like; the appropriate selection of which depends upon the nature of the solvent and the difference in specific gravity between the phases comprising the two phase system. The stabilizer can be removed from the formed gel particles by washing with an appropriate solvent.

The present invention is further illustrated by the following examples.

EXAMPLE 1

An aqueous solution was prepared by dissolving 63: of N,N'-(diacrylamidomethyl) ethylene urea and 300g of acrylamide in 3 liters of deionized water followed by the addition of 0.6g of ammonium persulfate and 24.6g of sodium acetate. Separately, another solution containing 60g of cellulose acetate butyrate in 3.4 liters of chlorobenzene was prepared in 7 liter reaction vessel and stirred at a speed of 300 r.p.m. To the reaction vessel was added the previously prepared aqueous solution, and the mixture was stirred vigorously while keeping the temperature below 60°C, so that substantially all of the aqueous solution was formed into a uniform suspension of spherical droplets having a size of 100 to 150 mesh. The temperature was then increased to 70°C to initiate polymerization, which was continued at that temperature for 2 hours to complete the polymerization and gelation. The gel particles were separated, washed with dichloroethylene and dehydrated with alcohol. The dehydrated particles were dried in a vacuum desiccator. Spherical xerogel particles having a size of 200 to 325 mesh were obtained in an amount of 347g, 95.5 percent of the theoretical amount.

The water regain of the dried xerogel thus prepared was 6.7g water per 1 g of gel; the gel was characterized by a uniform particle size between 100 and 150 mesh in the swollen state.

The gel was allowed to swell in aqueous 0.5M sodium chloride solution and packed in a glass column having an inner diameter of 1 cm and a length of 42 cm.

The efficiency of the gel as chromatography material was evaluated in the following manner.

A sample solution containing 1 ml of deionized water, 1 mg of Blue Dextran 2000 having an estimated molecular weight of 2,000,000, 15 mg of conalbumin having a molecular weight of 87,000, 4 mg of ovalbumin having a molecular weight of 46,000 and 7 mg of lysozyme having a molecular weight of 14,600 was poured onto the top of the column and the column was eluted at a speed of 5 ml/hr. The effluent was collected in 1 ml fractions, and ultraviolet absorbance at 280 m$\mu$ of each fraction was measured. The result showed that each substance in the sample mixture were clearly separated in the decreasing order of the molecular weight; that is, the ultraviolet absorption maximum for Blue Dextran was at the 10.1 ml fraction, for conalbumin was at 14.8 ml fraction, for ovalbumin was 19.0 ml fraction and for lysozyme was 28.8 ml fraction, respectively.

EXAMPLE 2

An experiment was carried out following the procedure of Example 1, with the exceptions that 0.6g of ammonium persulfate was replaced with 30 percent hydrogen peroxide in an amount of 8 percent based on the weight of acrylamide used, the suspension was prepared at 40°C or less, and the reaction was conducted at 55°C for 4hours. Thus, spherical gels having a size of 200 to 325 mesh were obtained in an amount of 24.6g, corresponding to 89.5 percent of the theoretical amount.

EXAMPLE 3

Example 2 was repeated, with the exception that a suspension was made by replacing 30 percent hydrogen peroxide with 50 percent hydrogen peroxide in an amount of 13.3 percent based on the weight of acrylamide at a temperature of 50°C, and the reaction was conducted at 65°C. Spherical gel, containing alcohol used in the dehydration, was obtained in an amount of 368g, and alcohol was removed in a vacuum desiccator to give 324g of dried spherical gel having a size of 100 to 200 mesh, which correspond to 84.6 percent of the theoretical yield.

EXAMPLE 4

An aqueous solution was prepared by dissolving 60g of N,N'-(diacrylamidomethyl) propylene urea in 1,500g of de-ionized water and adding thereto 0.12g of ammonium persulfate and 10g of sodium acetate. The aqueous solution was mixed with a solution containing 30g of cellulose acetate butyrate in 5 liters of chlorobenzene. The reaction was carried out as described in Example 1 to obtain 50g of a dried spherical gel having a size of 100 to 200 mesh.

The swollen spherical gel was packed in a glass column having an inner diameter of 1 cm and a length of 42 cm. One ml of a sample mixture containing 3 mg of ovalbumin and 10 mg of sodium chloride was poured onto the top of the column, and eluted with deionized water at a rate of 4 ml per hour. The effluent was collected in 1 fractions. Ovalbumin was eluted between 8th and 12th fractions and sodium chloride was eluted between 18th and 24th fractions; thus the gel showed the expected molecular sieve effect.

EXAMPLE 5

An aqueous solution was prepared by dissolving 105g of N,N'-(diacrylamidomethyl) ethylene urea, 100g of methacrylamide and 200g of acrylamide in 860 ml of deionized water and adding thereto 0.71g of potassium persulfate and 7.03g of sodium acetate.

Separately, an organic solution was prepared in a 4 liter reaction vessel by charging 2 liters of dichloroethylene and 51g of cellulose acetate. The previously prepared aqueous solution was added to the organic solution, and the mixture was stirred at 250 r.p.m. Then the temperature was increased to 55°C. The agitation was controlled so that substantially all of the suspended particles became a size of 100 to 150 mesh, while the temperature was maintained at 55°C. Subsequently, the temperature was increased to 65° to 70°C, and the reaction rate was increased by maintaining that temperature. Under this condition, the stirring was continued for 2 hours to complete gelling.

The sperical gel was separated from the solvent, washed with dichloroethylene and dehydrated with methyl alcohol. The gel containing methyl alcohol was dried in a vacuum desiccator to remove the alcohol and obtain completely dried gel. Thus, spherical gel having a size of 150 to 200 mesh was obtained in an amount of 380g corresponding to 94 percent of theoretical amount. The dry gel absorbed 2.8g of water per 1 g of the gel.

The dried gel thus obtained was placed in distilled water and allowed to swell over night. The swollen gel possessed a uniform particle size of 100 to 150 mesh. The gel was packed in a glass column having an inner diameter of 1 cm and a length of 40 cm. A sample mixture containing 5 mg of ovalbumin and 348 mg of sodium chloride in 1 ml of deionized water was poured onto the top of the column and the column was eluted at a rate of 5 ml/hr. Each 1 fraction of the effluent was collected, and the compoents were determined by measuring the ultraviolet absorbance at 280 m$\mu$ in case of ovalbumin and by quantitative determination of halogen ions in case of sodium chloride. The result showed the complete separation of the two solutes, showing the maximum peaks for ovalbumin at 8th fraction and for sodium chloride at 22th fraction.

EXAMPLE 6

An aqueous solution was prepared by dissolving in 4.5 liter of deionized water, 95g of N,N'-(dimethacrylamidomethyl) trimethylene urea, 675g of acrylamide, 22.5g of sodium acetate and 3.85g of potassium persulfate. 10 liters of chlorobenzene was placed in a 20 liter reaction vessel and heated to 50°C. The aqueous solution was added to the reaction vessel with stirring. Stirring was continued at 300 to 350 r.p.m. until almost all the dispersed particles of the aqueous solution in the chlorobenzene became an uniform suspension having a particle size between 200 and 500 mesh. Then, the contents of the reaction vessel were heated at 60° to 65°C in the stream of nitrogen gas for 4 hours to complete the polymerization and gelation of the reactants. The spherical gel thus obtained was separated from the solvent, and dehydrated by washing with methyl alcohol. The dehydrated gel was placed in a drier in the stream of air to remove methyl alcohol contained therein. Thus, 639 of a dried gel having a particle size of 200 to 500 mesh was obtained. The yield corresponds to 83 percent of theory.

What is claimed is:

1. A process for preparing a cross-linked polymeric gel chromatography material, which comprises subjecting at least one ethylenically unsaturated compound selected from the group consisting of acrylamide, methacrylamide, acrylic acid, methacrylic acid, itaconic acid, maleic acid and bisacrylamide, and at least one compound having the formula:

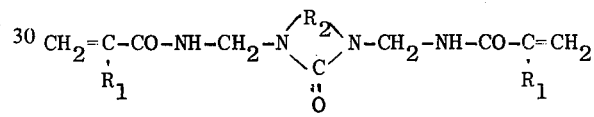

wherein $R_1$ represents a hydrogen atom or a methyl group and $R_2$ represents an ethylene or trimethylene group, the ratio of the urea compound to the ethylenically unsaturated compound being 2 : 98 to 60 : 40, to suspension polymerization, which is effected in a suspension of an aqueous or alcoholic solution of said ethylenically unsaturated compound and said urea compound in an inert organic solvent immiscible with the solution and having a specific gravity approximating that of the reactant solution, in the presence of a free radical initiator in the range of 0.1 to 10 percent based on the weight of the reactant to be polymerized at a temperature of 50° to 90°C while stirring, and continuing polymerization until gelatin occurs.

* * * * *